(12) United States Patent
Bhageria et al.

(10) Patent No.: US 10,241,534 B2
(45) Date of Patent: *Mar. 26, 2019

(54) DISTRIBUTION MODEL RESPONSIVE TO ASSET IDENTIFICATION

(71) Applicant: INTERNATIONAL BUSINESS MACHINES CORPORATION, Armonk, NY (US)

(72) Inventors: Gopal K. Bhageria, Overland Park, KS (US); Kevin M. Monagle, Wellesley, MA (US); Jean-Gael F. Reboul, Kenmore, WA (US); Matthew B. Trevathan, Roswell, GA (US)

(73) Assignee: International Business Machines Corporation, Armonk, NY (US)

( * ) Notice: Subject to any disclaimer, the term of this patent is extended or adjusted under 35 U.S.C. 154(b) by 260 days.

This patent is subject to a terminal disclaimer.

(21) Appl. No.: 15/210,195

(22) Filed: Jul. 14, 2016

(65) Prior Publication Data

US 2016/0320786 A1 Nov. 3, 2016

Related U.S. Application Data

(63) Continuation of application No. 13/934,381, filed on Jul. 3, 2013, now Pat. No. 9,424,614.

(51) Int. Cl.
*G05F 1/66* (2006.01)
*G06Q 10/06* (2012.01)
(Continued)

(52) U.S. Cl.
CPC .............. *G05F 1/66* (2013.01); *G06Q 10/06* (2013.01); *G06Q 50/06* (2013.01); *H04W 4/021* (2013.01)

(58) Field of Classification Search
CPC ......... G05F 1/66; H04W 4/021; G06Q 10/06; G06Q 50/06
(Continued)

(56) References Cited

U.S. PATENT DOCUMENTS 8,081,989 B2 12/2011 Manson et al.
2004/0122688 A1* 6/2004 Janda ................. G06K 17/0022
705/34

(Continued)

OTHER PUBLICATIONS

Randy Trott, Timmons Group, Dominion and Verizon Use Mobile GIS and GPS to Conduct Joint-Use Pole Survey, ERSI, ArcNews Online, Winter 2004/2005, pp. 1-4.
(Continued)

*Primary Examiner* — Chun Cao
(74) *Attorney, Agent, or Firm* — Patrick J. Daugherty; Daugherty & Del Zoppo Co., LPA

(57) ABSTRACT

Models of a distribution network grid are automatically updated in response to real-time location data of uniquely identified temporary devices. Current geographical coordinates are determined within a distance tolerance that is selected as a function of a type of device indicated by the identity indicia. The geographical information system model is updated with a location of a unique identity of the device at the determined current geographical coordinates within the distance tolerance if unique identity of the device not already present within the geographical information system model, or if it is present and a displacement distance from the determined current geographical coordinates of the temporary device to existing geographic coordinates that are stored in the geographical information system model in association with the unique device identity exceeds a specified distance margin.

13 Claims, 2 Drawing Sheets

(51) Int. Cl.
*G06Q 50/06* (2012.01)
*H04W 4/021* (2018.01)

(58) Field of Classification Search
USPC .......................................................... 700/295
See application file for complete search history.

(56) References Cited

U.S. PATENT DOCUMENTS

| | | |
|---|---|---|
| 2005/0211777 A1 | 9/2005 | Wetzel |
| 2006/0288014 A1 | 12/2006 | Edwards et al. |
| 2009/0281674 A1 | 11/2009 | Taft |
| 2012/0313780 A1 | 12/2012 | Stout |
| 2013/0241535 A1* | 9/2013 | Magnussen .......... G01R 31/026 324/126 |

OTHER PUBLICATIONS

Wu et al, Overview of Real-time Database Management System Design for Power System SCADA System, IEEE, 2006, pp. 62-66.
U.S. Appl. No. 13/934,381, filed Jul. 3, 2013, Confirmation No. 4495.
Notice of Allowance (dated May 6, 2016) for U.S. Appl. No. 13/934,381, filed Jul. 3, 2013, Confirmation No. 4495.

* cited by examiner

DISTRIBUTION MODEL RESPONSIVE TO ASSET IDENTIFICATION

FIELD OF THE INVENTION

The present invention relates to the design and management of electrical power distribution systems in response to the identification of temporary distribution component installations and associated infrastructure revisions.

BACKGROUND

Utilities and other large-scale electrical energy providers generally rely on a number of automated systems and tools to efficiently and safely distribute electricity over distribution grids. Geographical Information Systems (GIS) and Asset Management Systems (AMS) are used to model the location of power system equipment and the network connectivity. Supervisory Control And Data Acquisition (SCADA) systems, Distribution Management Systems (DMS) and Outage Management Systems (OMS), Customer Information Systems (CIS), Interactive Voice Response Systems (IVRS), Information Storage & Retrieval (ISR) system, Communication (COM) Servers, Front-End Processors (FEPs) and Field Remote Terminal Units (FRTUs) are typically used by supervisory personnel to monitor and control in real-time the electrical grid as modeled by the GIS/AMS.

Generally, DMS, OMS and SCADA components present information with respect to performance of utility distribution grid structures in delivering electrical power to end users in centralized consoles or offices in an integrated manner. Such centralized structures generally require the design and maintenance and consideration of detailed component and connectivity models and schematics by service personnel in order to ensure safe and reliable electrical power delivery. Maintaining such models to accurately represent the grid components actually deployed and in use with large-scale grids in a timely and effective manner presents a number of challenges to effective and efficient use of utility personnel.

BRIEF SUMMARY

In one aspect of the present invention, a method for automatically updating modeling of a distribution network grid in response to real-time location data of uniquely identified temporary devices includes acquiring identity indicia for a temporary device that is installed within an electrical distribution grid. The distribution grid is modeled by a geographical information system of a utility that provides electricity to end users through components of the distribution grid. The method comprehends determining current geographical coordinates within a distance tolerance that is selected as a function of a type of device indicated by the identity indicia. The geographical information system model is updated with a location of a unique identity of the device at the determined current geographical coordinates within the distance tolerance if unique identity of the device is not already present within the geographical information system model, or if it is present and a displacement distance from the determined current geographical coordinates of the temporary device to existing geographic coordinates that are stored in the geographical information system model in association with the unique device identity exceeds a specified distance margin.

In another aspect, a system has a processing unit, computer readable memory and a tangible computer-readable storage medium with program instructions, wherein the processing unit, when executing the stored program instructions, acquires identity indicia for a temporary device that is installed within an electrical distribution grid. The distribution grid is modeled by a geographical information system of a utility that provides electricity to end users through components of the distribution grid. The processing unit also determines current geographical coordinates within a distance tolerance that is selected as a function of a type of device indicated by the identity indicia. The geographical information system model is updated by the processing unit with a location of a unique identity of the device at the determined current geographical coordinates within the distance tolerance if the unique device identity is not already present within the geographical information system model, or if it is present and a displacement distance from the determined current geographical coordinates of the temporary device to existing geographic coordinates that are stored in the geographical information system model in association with the unique device identity exceeds a specified distance margin.

In another aspect, a computer program product for automatically updating modeling of a distribution network grid in response to real-time location data of uniquely identified temporary devices has a tangible computer-readable storage medium with computer readable program code embodied therewith, the computer readable program code comprising instructions that, when executed by a computer processing unit, cause the computer processing unit to acquire identity indicia for a temporary device that is installed within an electrical distribution grid. The distribution grid is modeled by a geographical information system of a utility that provides electricity to end users through components of the distribution grid. The processing unit also determines current geographical coordinates within a distance tolerance that is selected as a function of a type of device indicated by the identity indicia. The geographical information system model is updated by the processing unit with a location of a unique identity of the device at the determined current geographical coordinates within the distance tolerance if the unique device identity is not already present within the geographical information system model, or if it is present and a displacement distance from the determined current geographical coordinates of the temporary device to existing geographic coordinates that are stored in the geographical information system model in association with the unique device identity exceeds a specified distance margin.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

Figure 1:
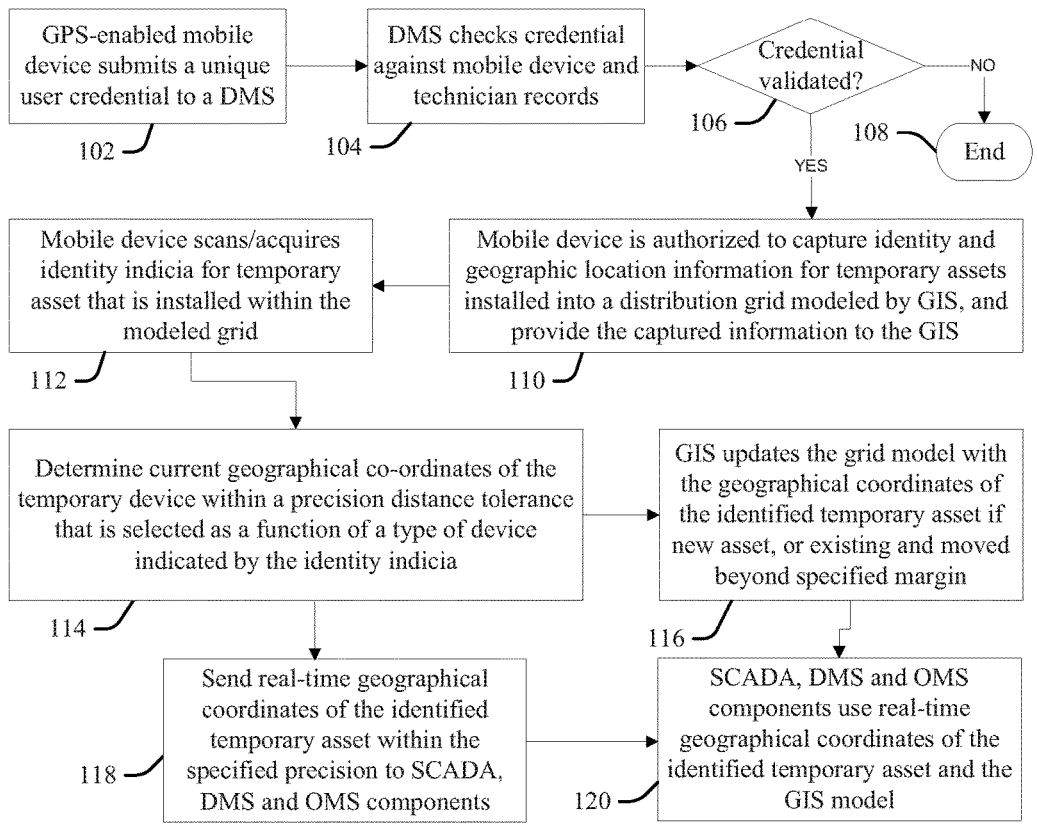
FIG. 1 is a flow chart illustration of a method, system or process according to the present invention for automatically updating modeling of a distribution network grid in response to real-time, precise location data of uniquely identified temporary devices deployed within the grid.

The drawings are not necessarily to scale. The drawings are merely schematic representations, not intended to portray specific parameters of the invention. The drawings are intended to depict only typical aspects, examples and embodiments of the invention, and therefore should not be considered as limiting the scope of the invention. In the drawings, like numbering represents like elements.

DETAILED DESCRIPTION

Geographical Information Systems (GIS) generally provide a system of records used by SCADA, DMS and OMS components to generate a real-time operational electrical model of a distribution network or grid for a utility or other electricity provider. Distribution networks may be classified as radial or interconnected networks. A radial network has long power lines serving isolated load areas by distributing electricity from a single, central power supply point or station through the network area without connection to any other supply, and is typically found in rural settings with low population and consumer endpoint densities.

Interconnected networks are generally found in more urban areas or other areas with higher consumer endpoint densities and have multiple connections to multiple, independent power supply points. The points of connection are normally open, but various and different configurations of the grid may be achieved by selectively closing and opening the switches, in order to provide a wide variety of power supply profiles to each of different power consumer endpoints. Operation of interconnected network grid switches may be by remote control from a control center, or through direct, manual operation on-site by a lineman or other service personnel. In the event of a fault or required maintenance, a small area of an interconnected model network can be isolated, wherein the remainder may be kept on supply.

Long electrical supply lines, or feeders, experience voltage drops over their length from the supply point to an endpoint. Capacitors and voltage regulators may be installed at various points along the long feeders to prevent such voltage drop characteristics to reduce the power delivered to consumers at various endpoints served by the feeders, to thereby assure delivery of specified or minimum required levels and quality of electricity to the respective service endpoints.

The characteristics of the supply given to and required by endpoint customers are mandated by contract between the supplier and customer, as well as by standards and regulations enforced by utility regulators, for example as provided by International Electrotechnical Commission (IEC) Standard No. 61968, which defines standards for information exchanges between electrical distribution system applications. Variables of the supply contemplated by such agreements and standards, include type of electricity, namely Alternating Current (AC) or Direct Current (DC); nominal voltage specifications and associated tolerances (for example, within plus or minus 5 percent of the nominal voltage specification); frequency, including 50 or 60 Hertz (Hz) for typical consumers, 16.6 Hz and 25 Hz for some electric railways, and 25 Hz for some industrial and mining end users; phase configuration (single-phase and poly-phase, including two-phase and three-phase); maximum demand that will be satisfied (for example, measured as the largest mean power delivered within a specified time period); load factor, expressed as a ratio of average load-to-peak load over a period of time and indicative of a degree of effective utilization of equipment of a distribution line or system; power factor of connected load; earthing system specifications, which define the electrical potential of conductors of the distribution network relative to the Earth's conductive surfaces (ground); prospective short circuit current; and maximum level and frequency of occurrence of transients.

The distribution networks are often considered the primary focus of grid changes. They offer all the required functional services to electricity distributors to and from customers, as well as the services to manage distributed energy resources, including energy storage, plug-in electric vehicles, etc. However, the accuracy and reliability of the implementation in real-time of systems and tools discussed above in maintaining the distribution networks is highly dependent on the data precision and quality of the GIS data.

More particularly, large systems may experience a large number of temporary configuration modifications and equipment changes, often experiencing multiple changes on a daily basis from service personnel actions taken to change network configurations to isolate faults, restore services, or perform maintenance. Modifications include cuts, jumpers, temporary switches, and grounds applied at various points in a network by field crews, and they should be reflected in the network operations model in order to maintain the correct network topology.

With regard to temporary asset modifications in an electrical grid, a cut refers to a temporary break of one or more phases, and it may be generally placed on any type of line. Jumpers are temporary switch connections between parts of feeder backbones or laterals, and are used to provide a means of energizing laterals or portions of feeders that have been isolated because of faults or maintenance. When combined with cuts, jumpers may allow a large variety of types of temporary network modifications to be accurately modeled. Phase jumpers connect a jumper from phase to phase on a single line.

Temporary modifications also include grounds placed on de energized sections of a line. Mobile Substations are pre-defined substations that can be placed anywhere in the distribution grid, and are generally connected to the network by the use of a jumper. Mobile Generators are distributed energy resources that can be connected temporarily to the distribution grid to provide power to customers suffering from an outage, and these are also generally connected to the network by the use of a jumper.

Accounting for the impact of such temporary changes presents a number of challenges. In some implementations, about 10% of distribution network feeders modeled within a grid must be updated every day due to configuration changes or modification of power system equipment components and line connections. Accordingly, a new model must be brought online on a regular basis in order to distribution dispatchers to operate the grid within expected and required specifications, which increases the level of effort needed to maintain and implement GIS models so that they are not discordant with the actual, modeled electrical network.

FIG. 1 illustrates a method, system or process for automatically updating modeling of a distribution network grid in response to real-time, precise location data of uniquely identified temporary devices deployed within the grid. At 102 a Global Positioning Satellite (GPS)-enabled mobile programmable device executing a mobile application submits a unique user credential to an identity management component of a utility grid via a network communication. The unique user credential is unique to and identifies and distinguishes both the mobile device and the technician operating the device from other devices and technicians, respectively. At 104 the utility grid identity management component checks the credential against mobile device and technician records (for example, via comparison to information technology department records, employee records kept within an Identity Management System (IDM), etc.).

If the credential is not within the records, and not otherwise verified or validated as associated with an authorized device and operating technician at 106, then the process ends at 108. Else, if the credential is verified or validated as actively registered and valid within the compared records, then at 110 the mobile device is authorized to capture identity and geographic location information for a temporary asset that is installed into a distribution gird and provide said captured information to an enterprise Asset Management System (AMS) in communication with or incorporated within a GIS of a utility system. Capturing asset identity characteristics includes scanning unique item bar code identifications that provide information about the asset. If bar code data is missing or not available, then the asset may be identified by model information or otherwise looked up by the AMS in network communication with the authorized mobile device, thereby providing the technician specific item information that includes voltage carrying characteristics of the item, for example impedance and voltage loss values, etc. The technician may also use the mobile device to communicate type and other identity indicia to a utility operations center for manual look-up and retrieval of the information at the operations center and provision of the material in reply to the technician operating the mobile device.

At 112 the mobile device scans or otherwise acquires identity indicia for a temporary asset that is installed within the modeled grid, and at 114 activates GPS capability and determines the current geographical co-ordinates of the temporary device within a precision distance tolerance that is selected as a function of a type of device indicated by the identity indicia. In some aspects determining the current geographical co-ordinates at 114 includes determining current three-dimensional (3-D) geographical co-ordinates (horizontal (latitude and longitude) and vertical (altitude)) of the temporary device within the precision distance tolerance.

At 116, in response to receiving the identity indicia and the current geographical co-ordinates for the temporary asset from the mobile device, a GIS component of the utility updates the grid model with the geographical coordinates of the identified temporary asset if the asset is new and not already existing within the grid model (the unique identity of the device indicated by the identity indicia is not present within the geographical information system model); or if the asset exists within the model but has moved relative to the coordinates reflected in a current GIS model record for the asset beyond a specified margin distance (the unique identity of the device indicated by the identity indicia is present within the geographical information system model and that the determined current geographical coordinates of the temporary device differ by a specified distance margin from existing geographic coordinates that are stored in the geographical information system model in association with the unique device identity).

At 118 the mobile device sends, in real-time, the geographical coordinates (longitude, latitude, and altitude) of the identified temporary asset within the specified precision to real-time systems of the utility that are responsible to monitor and control the network topology of distribution grid, including SCADA, DMS and OMS components. At 120 the SCADA, DMS and OMS components use the real-time geographical coordinates of the identified temporary asset provided by the mobile device and the GIS model as updated or not at 116 to update their real-time operational model and underlying visualization of distribution grid and accordingly perform their respective functions in support of the utility.

Figure 2:
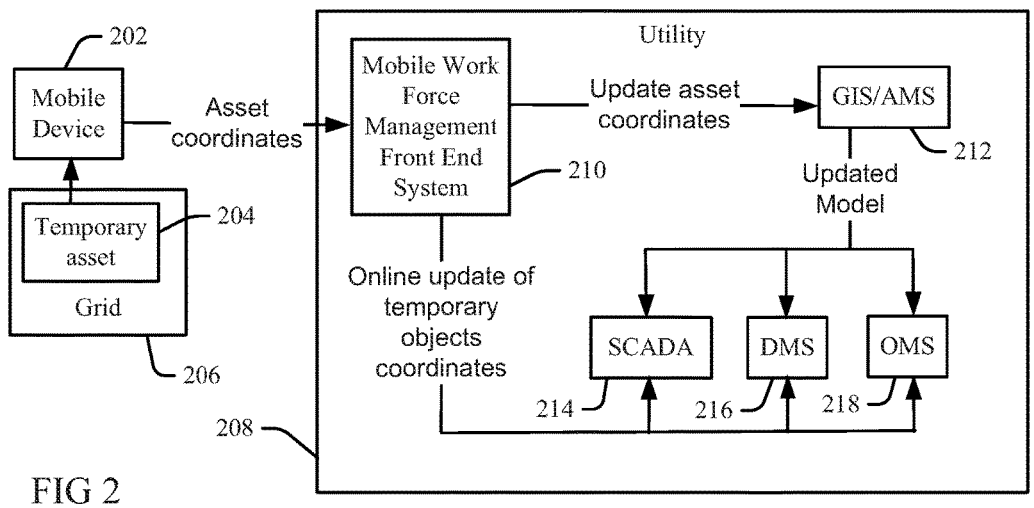
FIG. 2 is a block diagram illustration of a mobile device according to the present invention in communication with grid distribution and utility components.

FIG. 2 illustrates an implementation of the present invention wherein a mobile device 202 when authorized (for example, at 110 of FIG. 1) acquires identity indicia for a temporary device or asset 204 that is deployed within a power supply grid 206. The mobile device 202 determines the geographic coordinates of the asset 204 within the specified precision, and provides the asset identity indicia and acquired coordinates to a Mobile Work Force Management Front End System 210 of a utility 208 that is supplying power to endpoint customers by use of the grid 206. The Work Force Management Front End System 210 updates geographic asset coordinates for the temporary asset 204 within the GIS/AMS component 212 of the utility 208. In response, the GIS 212 updates a model of the grid model (if the asset is new or has moved beyond the specified margin) and provides the updated model to a SCADA 214, DMS 216 and OMS 218 of the utility 208, which each update their own models responsively. The Work Force Management Front End System 210 also directly provides on-line, real-time updates of the captured asset information of the temporary asset 204, including the determined geographical coordinates, to each of the SCADA 214, DMS 216 and OMS 218.

More particularly, the GIS 212 revises the grid model (at 116) to account for any change in quality of electrical energy delivery by the grid that is caused by the determined location of the identified temporary asset 204. At 118 the SCADA 214, DMS 216 and OMS 218 consider the impact of the identified temporary assets as a function of their respective coordinates determined by the mobile device 202 on the power delivery characteristics of the grid modeled as updated (or not) by the GIS 212. In one aspect, this process thereby accurately determines the impedance impact of an identified jumper, or the effect of a new or additional amount of power supplied by a temporary power supply asset, wherein the impact of the temporary asset 204 may be dependent on a geographic distance of the temporary asset from power supply inputs or consumer endpoints.

The precision distance tolerance at 114 and the specified margin at 116 are selected and applied as relevant to determining an energy delivery performance characteristic of the temporary asset or device type, wherein a reported location that varies by more than the precision distance tolerance or specified margin would change a value of the energy delivery performance characteristic of the device type. In one example, a jumper line temporary asset installed into a feeder of a grid has higher impedance per foot (ft., or 0.3 meters) of linear length of the jumper than an impedance value per linear foot length of the original feeder line. Therefore, insertion of the jumper into the grid will have an impedance impact on the modeled grid that varies by length of the jumper in feet. Accordingly, in recognition that the temporary asset type is a jumper, the precision distance tolerance selected and applied at 114, and the specified margin selected and applied at 116, are each one foot, selected in response to the jumper impedance having a value defined per foot of linear length. Thus, the location of the jumper along the feeder may be determined within a foot of an actual installation point or termination point in any of the three coordinate directions (latitude, longitude and altitude), and movement or the jumper by more than one foot of displacement in any of these three directions will trigger a revised GIS model at 116. An insertion connection point commences an insertion of the jumper into the feeder that begins a bypass of a portion of the original feeder line with respect to the flow of electricity to a consumer endpoint through the feeder, and the termination point terminates the jumper back into the feeder (or other component of the grid) with respect to the flow of electricity so that the flow resumes as modeled in the grid (within the modeled impedance and voltage drop parameters, etc.).

If the device identity indicia indicates a length in feet of the jumper, then only one of the insertion and termination points needs be determined and identified, and the exact location and length of the jumper within the modeled grid may be determined by the mobile device, GIS, SCADA, DMS or OMS as a function of the known length of the jumper, as prior to the termination point by said length, or after the insertion point by said length. For example, the current temporary asset geographical coordinates may be determined as the geographical coordinates of the jumper insertion point, the length of the jumper determined from the model of the jumper associated with the temporary asset identity indicia, the grid model updated to substitute the jumper for a portion of the feeder line from the current temporary asset geographical coordinates toward an endpoint consumer over the determined length of the jumper.

If the length of the jumper is not known by the identity indicia, or is not ascertained and manually entered by the technician, then each of the insertion and termination points may be entered by the technician via the mobile device and the mobile device, GIS, SCADA, DMS or OMS components may determine the jumper length at 114 as a function of a difference in displacement distance between entered geographic locations of the respective points. For example, determining a beginning set of geographical coordinates of a first end of the jumper that is inserted into the feeder at the insertion point that commences a bypass of the feeder by electricity flowing through the feeder to an endpoint consumer, and a termination set of geographical coordinates of the other (second) end of the jumper that is inserted into the feeder at the termination point that ends the bypass of the feeder by the flowing electricity, which now flows out of the jumper and back into the feeder and onward through the feeder to the endpoint consumer. Thus, the length of the jumper may be determined as the displacement distance between the geographical coordinates of the respective end (insertion) points of the jumper.

In another example, the temporary device 204 scanned and located at 112 and 114 is a mobile substation connected to the grid 206 via a jumper. If varying the physical location of the mobile substation by less than three hundred feet does not impact grid modeling by the GIS, or impact application of an updated model by the SCADA, DMS or OMS components, then the precision distance tolerance selected at 114 as relevant to determining an energy delivery performance characteristic of the mobile substation is three hundred feet. However, as noted above, a jumper connecting the mobile substation to the feeder may have differing impacts based on one foot increments, and therefore a jumper connecting the mobile substation to a feeder may be located within a one foot precision, which also indirectly imparts a one-foot precision to the location of the mobile substation at the point of connection to the jumper.

Figure 3:
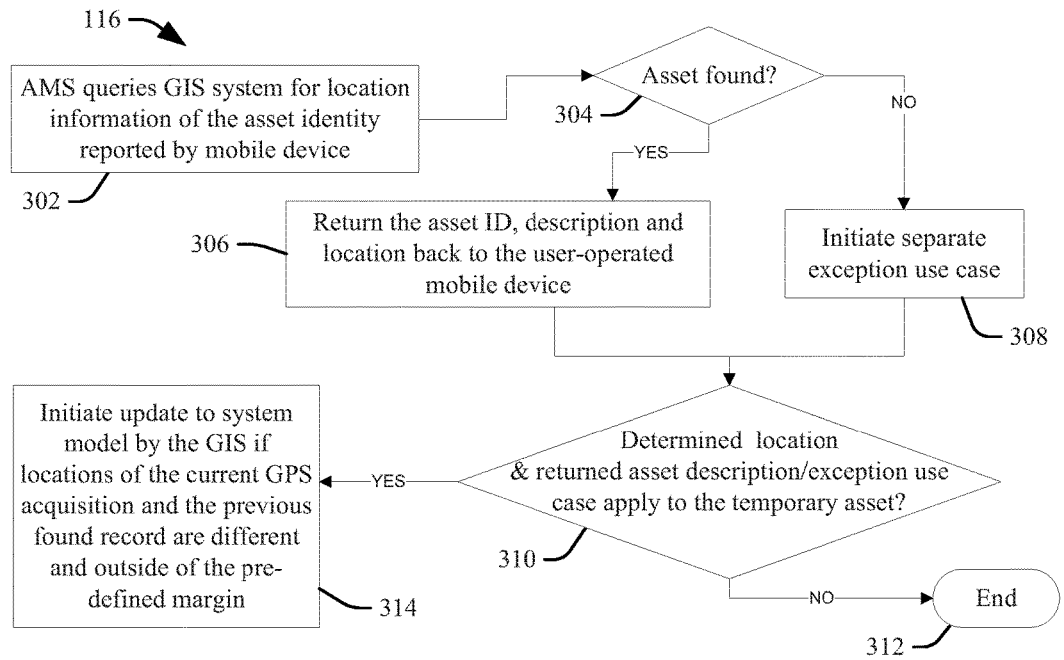
FIG. 3 is a flow chart illustration of one aspect of the method, system or process of FIG. 1.

FIG. 3 illustrates one aspect of the decision to update the GIS model at 116. In response to the data sent by mobile device, at 302 the Asset Management System (AMS) queries the GIS system for location information of the identified asset, and if found at 304 returns the asset ID, description and location back to the user-operated mobile device at 306. If the asset is not found at 304, then a separate exception use case is initiated at 308. The user then verifies at 310 whether the returned asset description and location retrieved from GIS system, or the new exception use case initiated at 308, and the current location determined from GPS data correctly apply to the temporary asset under consideration. If not, then an error condition occurs and the process ends at 312. However, if the user verifies the data at 310 and the two locations of the current GPS acquisition and the previous found records are different and outside of the pre-defined margin, then the user initiates the update to the system model by the GIS at 314.

In some aspects, analytics engines generate a variety of reports from data generated during the processes described above, for example providing a list of updated locations of assets along with required audit traceability (who updated it, when, etc.).

Aspects of the present invention provide for real-time feeding and updating of the location geographical co-ordinates of regular electrical assets (i.e., transformer, capacitor, pole, feeder, etc.) as well as temporary assets such as jumpers, cuts in line, etc., to a GIS database via the use of mobile devices. Utility companies generally employ a large mobile workforce to perform planned and unplanned maintenance tasks on power system equipment items that are responsible for transmitting electricity from a transmission network to loads or customers. By providing each worker a mobile device according to the present invention this resource can be readily leverage into improved GIS modeling and other automated component task performances.

Network Connectivity Analysis (NCA) with regard to a distribution network usually covers a large geographic area and must also be responsive to the different power or voltage levels required by different customers. NCA is an operator-specific functionality which helps an operator to identify or locate a preferred network or component and provide a display of the feed points of various network loads. A prevailing network topology or grid model may be determined based on the status of all the switching devices such as Circuit Breakers (CB), Ring Main Units (RMU) and/or isolators that affect the topology of the modeled network. The NCA further assists the operator to know the operating state of the distribution network indicating radial mode, loops and parallels in the network.

Locating required sources and loads on a large GIS/Operator interface is often very difficult. Panning and zooming mechanisms provided within a conventional SCADA system Graphical User Interface (GUI) often fail to adequately identify components within a grid to a degree of accuracy needed to model and cover operational requirements. More particularly, conventional panning and zooming mechanisms are generally limited to recognize longitude and latitude coordinates. By incorporating altitude information as well, aspects of the present invention enable three-dimensional (3-D) geospatial visualization and modeling of the distribution of grid within GUI application and mechanisms, as well as provide enhanced grind component distinguishing capabilities.

For example, a given utility pole used within a grid may carry several different distribution lines and associated breakers or capacitors. An operator viewing a conventional geographical display may not be able to distinguish and select the correct line or device on the pole that is incorporating a temporary device based solely on the longitude and latitude coordinates of the utility pole reported by a field technician. In contrast, aspects of the present invention determine (at 114 of FIG. 1) 3-D coordinates of a device detected or scanned, etc., which are used to create or update 3-D geographical models of the grid within the GIS, SCADA, DMS and/or OMS systems (at 116 and/or 120) within a precision distance tolerance at 114 and a specified margin at 116 that are selected to distinguish grid elements incorporating the temporary assets from other grid elements location in close proximity.

More particularly, aspects enable an operator or GIS, SCADA, DMS and/or OMS systems to (automatically) distinguish (for example, at 304 of FIG. 3) between and select a correct one of pluralities of lines and devices that share common values of two of the determined longitude, latitude and altitude coordinates determined for a temporary device (at 114, FIG. 1). For example, two power lines strung between the same two utility poles in parallel and above one another vertically would share the same latitude and longitude coordinates, but are distinguished by having different altitude (vertical) locations along the height of the poles, and the difference between their vertical/altitude coordinates will reflect a vertical spacing distance between the lines that is greater than the precision distance tolerance specified and applied at 114 and the margin specified and applied at 116. Two other power lines strung between the same two utility poles in parallel but next to each other at common altitude (or vertical orientation or height) will share the same altitude coordinates over their respective lengths strung upon and between the poles, but wherein their horizontal coordinates (one or both of the latitude and longitude coordinates) of the respective lines will vary over the same lengths, and the difference between their horizontal coordinates will reflect a horizontal spacing distance between the lines greater than the precision distance tolerance specified and applied at 114 and the margin specified and applied at 116. Said differences are therefore used by aspects of the present invention to correctly identify the line incorporating the scanned/detected temporary asset from the other line.

More particularly, the precision distance tolerance applied at 114, 116, 118 and 120 of FIG. 1 is selected to be less than a physical displacement difference between grid components within horizontal and vertical planes. Only one of a plurality of different lines and devices modeled in the grid will share each of the 3-D coordinates (latitude, longitude and altitude) determined for the temporary device, or have coordinates that are proximate within said precision distance tolerance, signifying to the operator or GIS, SCADA, DMS and/or OMS systems that said grid element incorporates the temporary asset.

The determined coordinates may also be used to infer a 3-D view applicable to areas within and outside the substation fences and other grid area boundaries, in effect for schematic and geographical displays of a distribution grid and its surrounding areas. Generally, all existing and possible isolation and earthing (grounding) points on network power lines and circuits must be also included and considered in determining the grid model. Aspects of the present invention enable grid modeling revisions in real-time in response to temporary device implementation, and enable SCADA, DMS and OMS to verify in real-time that the grid may continue to provide power as agreed to an endpoint, in response to each new revision to the infrastructure caused by the presence of newly-detected temporary devices.

Rather than rely upon formal notice from a technician that a jumper has been placed in order to recalculate power distribution parameters, management of the grid according to the present invention automatically recognizes that a jumper has been deployed via receiving an input of a type of jumper (serial code) along with GPS coordinates in real-time from the mobile devices described above. Thus, utility systems are enabled to infer that a jumper has been placed by correlating the real-time GPS coordinate data with the known GPS locations of feeder lines, assuming that the feeder now has a jumper temporally installed, and recalculating the impedance, etc., of the feeder line based on the real-time GPS and device information which indicates the length of the jumper and its distance from a source and end node with precision. Conversely, removal of the temporary jumper may also be automatically detected as directly indicated by new, real-time asset temporary data that shows the absence of the temporary asset formerly detected, without the necessity of relying on manual, human-generated technician work order entries. Such auto-detection capabilities are particularly useful in large-scale grid structures, since a large number of devices may be installed or removed at any one time, sometimes simultaneously at different locations within the grid. System performance cannot be reliably inferred from observations alone without knowledge (in the real-time) of data indicating and confirming temporary asset removals and installation, otherwise the cause of certain performance observation will not be truly ascertainable. Aspects of the present invention enable a technician to work backwards from knowing the device ID and specific location of a given temporary asset to accurately determine any needed changes to the distribution system parameters to provide power at an endpoint as required/specified.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium excludes transitory, propagation or carrier wave signals or subject matter and includes an electronic, magnetic, optical or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that does not propagate but can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electromagnetic or optical forms or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
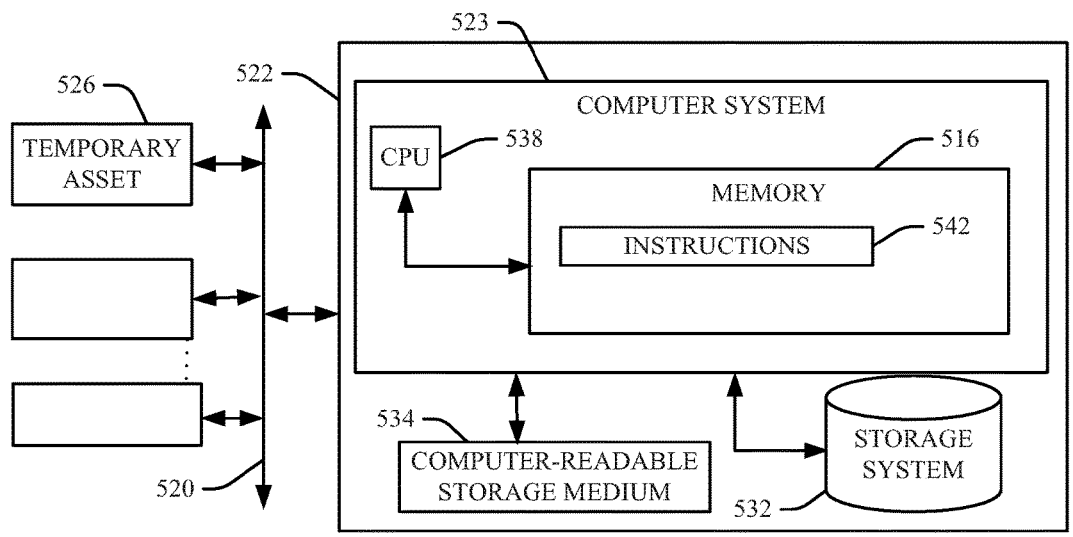
FIG. 4 is a block diagram illustration of a computer system implementation of an aspect of the present invention.

Referring now to FIG. 4, an exemplary computerized implementation of an aspect of the present invention includes a computer system or other mobile programmable device 522 in communication 520 with one or more temporary assets 526 (jumpers, mobile substations, phase jumpers, temporary grounds, etc.) that are deployed within a distribution grid. The mobile device 522 scans or otherwise retrieves identity indicia from or relevant to the temporary assets 526, and determines their geographic location coordinate data with a precision relevant to the impact of the temporary assets 526 on the grid, as described above with respect to FIGS. 1 through 3. Instructions 542 reside within computer readable code in a computer readable memory 516, or in a computer readable storage system 532, or other tangible computer readable storage medium 534 that is accessed by a Central Processing Unit (CPU) 538 of a computer system or infrastructure 523 of the mobile device 522. Thus, the instructions, when implemented by the processing unit 538, cause the processing unit 538 to automatically retrieve and provide temporary asset 526 identity and precise geographic locations in real-time as described above with respect to FIGS. 1 through 3.

In one aspect, the present invention may also perform process steps of the invention on a subscription, advertising, and/or fee basis. That is, a service provider could offer to integrate computer-readable program code into the computer system 522 to enable the computer system 522 to automatically retrieve, organize and display multiple-faceted results in response to a text string query as described above with respect to FIGS. 1 and 2. The service provider can create, maintain, and support, etc., a computer infrastructure, such as the computer system 522, network environment 520, or parts thereof, that perform the process steps of the invention for one or more customers. In return, the service provider can receive payment from the customer(s) under a subscription and/or fee agreement and/or the service provider can receive payment from the sale of advertising content to one or more third parties. Services may include one or more of: (1) installing program code on a computing device, such as the computer device 522, from a tangible computer-readable medium device 532 or 534; (2) adding one or more computing devices to a computer infrastructure; and (3) incorporating and/or modifying one or more existing systems of the computer infrastructure to enable the computer infrastructure to perform the process steps of the invention.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification, specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The aspect was chosen and described in order to best explain the principles of the invention and the practical application, and to enable others of ordinary skill in the art to understand the invention for various embodiments with various modifications as are suited to the particular use contemplated.

The flowchart and block diagrams in the figures illustrate the architecture, functionality, and operation of possible implementations of systems, methods and computer program products according to various aspects of the present invention. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for automatically updating modeling of a distribution network grid in response to real-time location data of uniquely identified jumpers, the method comprising:
  acquiring identity indicia for a jumper that is inserted into a feeder line at an insertion point within an electrical distribution grid, wherein the electrical distribution grid is modeled by a geographical information system model of a utility that provides electricity to end users through components of the electrical distribution grid, wherein the jumper has a jumper impedance value per foot of linear length, wherein the feeder has a feeder impedance value per foot of linear length, and wherein the jumper is inserted between parts of a feeder or connecting a first phase to a second phase on a single line;
  determining current geographical coordinates of the jumper within a distance tolerance that is selected as one foot in response to determining that the jumper impedance value differs from the feeder impedance value;
  determining if a unique identity of the jumper that is indicated by the identity indicia is present within the geographical information system model;
  updating the geographical information system model with a location of the unique identity of the jumper at the determined current geographical coordinates of the jumper within the distance tolerance in response to a determination selected from the group consisting of that the unique identity of the jumper is not present within the geographical information system model, and that a displacement distance from the determined current geographical coordinates of the jumper to existing geographic coordinates that are stored in the geographical information system model in association with the unique device identity exceeds the distance tolerance;
  providing the updated geographical information system model to an entity that is selected from the group consisting of a supervisory control and data acquisition system of the utility, a distribution management system of the utility, and an outage management system of the utility; and
  providing in real-time the determined current geographical coordinates of the jumper within the distance tolerance to the entity; and
  wherein the entity monitors and controls a network topology of the electrical distribution grid in real-time as a function of the provided updated geographical information system model and the determined current geographical coordinates of the jumper provided in real-time within the distance tolerance.

2. The method of claim 1, further comprising:
  integrating computer-readable program code into a mobile programmable device;
  wherein the mobile programmable device comprises a processing unit, a computer readable memory and a computer readable storage medium, and wherein the computer readable program code is embodied on the computer readable storage medium and comprises instructions that, when executed by the processing unit via the computer readable memory, cause the processing unit to perform the acquiring the identity indicia for the jumper, the determining the current geographical coordinates of the jumper, the determining if the unique identity of the jumper is present within the geographical information system model, the updating the geographical information system model with the location of the unique identity of the device at determined current geographical coordinates of the jumper within the distance tolerance, the providing the updated geographical information system model to the entity and the providing in real-time the determined current geographical coordinates of the jumper within the distance tolerance to the entity.

3. The method of claim 1, wherein the geographical coordinates are three-dimensional coordinates comprising a latitude coordinate, a longitude coordinate and an altitude value; and
  wherein the step of updating the geographical information system model with the location of the unique identity of the device at the determined current geographical three-dimensional coordinates of the jumper within the distance tolerance comprises selecting one of two power lines that share common values of no more than two of current geographical three-dimensional longitude, latitude and altitude coordinates determined for the jumper within the distance tolerance as a power line incorporating the jumper, in response to a determining a commonality of values of each of a three-dimensional longitude, latitude and altitude coordinates for the selected one of the two power lines within the distance tolerance; and
  wherein the distance tolerance is less than a vertical or horizontal spacing distance between the two lines that is defined by a difference in corresponding values of the two power lines for at least one of the three-dimensional longitude, latitude and altitude coordinates that are determined for each of the two power lines.

4. The method of claim 1, further comprising:
  determining the current geographical coordinates of the jumper as the geographical coordinates of the jumper insertion point;
  determining a specification length of the jumper from a model specified in the identity indicia; and
  updating the geographical information system model of the electrical distribution grid to substitute the jumper for a portion of the feeder line from the current geographical coordinates of the jumper toward an endpoint consumer over the determined specification length of the jumper.

5. The method of claim 1, further comprising:

determining a beginning set of geographical coordinates of a first end of the jumper that is inserted into the feeder at the insertion point that commences a bypass of the feeder by electricity flowing through the feeder to an endpoint consumer;

determining a termination set of geographical coordinates of a second, other end of the jumper that is inserted into the feeder at the termination point that ends the bypass of the feeder by the electricity flowing through the feeder to the endpoint consumer;

determining a displacement length of the jumper from a displacement distance between the beginning set of geographical coordinates of the first end of the jumper and the termination set of geographical coordinates of the second, other end of the jumper; and updating the geographical information system model of the electrical distribution grid to substitute the jumper for a portion of the feeder line from the beginning set of geographical coordinates of the first end of the jumper toward an endpoint consumer over the determined displacement length of the jumper.

6. A system, comprising:

a processing unit in communication with a computer readable memory and a computer-readable storage medium;

wherein the processing unit, when executing program instructions stored on the computer-readable storage medium via the computer readable memory:

acquires identity indicia for a jumper that is inserted into a feeder line at an insertion point within an electrical distribution grid that is modeled by a geographical information system model of a utility that provides electricity to end users through components of the electrical distribution grid, wherein the jumper has a jumper impedance value per foot of linear length, wherein the feeder has a feeder impedance value per foot of linear length, and wherein the jumper is inserted between parts of a feeder or connecting a first phase to a second phase on a single line;

determines current geographical coordinates of the jumper within a distance tolerance that is selected as one foot in response to determining that the jumper impedance value differs from the feeder impedance value;

determines if a unique identity of the jumper that is indicated by the identity indicia is present within the geographical information system model;

updates the geographical information system model with a location of the unique identity of the jumper at the determined current geographical coordinates of the jumper within the distance tolerance, in response to a determination selected from the group consisting of that the unique identity of the device is not present within the geographical information system model, and that a displacement distance from the determined current geographical coordinates of the jumper to existing geographic coordinates that are stored in the geographical information system model in association with the unique device identity that exceeds the distance tolerance;

provides the updated geographical information system model to an entity that is selected from the group consisting of a supervisory control and data acquisition system of the utility, a distribution management system of the utility, and an outage management system of the utility; and provides in real-time the determined current geographical coordinates of the jumper within the distance tolerance to the entity; and wherein the entity monitors and controls a network topology of the electrical distribution grid in real-time as a function of the provided updated geographical information system model and the determined current geographical coordinates of the jumper provided in real-time within the distance tolerance.

7. The system of claim 6, wherein the geographical coordinates are three-dimensional coordinates comprising a latitude coordinate, a longitude coordinate and an altitude value;

wherein the processing unit when executing the program instructions stored on the computer-readable storage medium via the computer readable memory updates the geographical information system model with the location of the unique identity of the device at the determined current geographical three-dimensional coordinates of the jumper within the distance tolerance by selecting one of two power lines that share common values of no more than two of current geographical three-dimensional longitude, latitude and altitude coordinates determined for the jumper within the distance tolerance as a power line incorporating the jumper, in response to a determining a commonality of values of each of a three-dimensional longitude, latitude and altitude coordinates for the selected one of the two power lines within the distance tolerance; and wherein the distance tolerance is less than a vertical or horizontal spacing distance between the two lines that is defined by a difference in corresponding values of the two power lines for at least one of the three-dimensional longitude, latitude and altitude coordinates that are determined for each of the two power lines.

8. The system of claim 6, wherein the processing unit, when executing the program instructions stored on the computer-readable storage medium via the computer readable memory:

determines the current geographical coordinates of the jumper as the geographical coordinates of the jumper insertion point;

determines a specification length of the jumper from a model specified in the identity indicia; and updates the geographical information system model of the electrical distribution grid to substitute the jumper for a portion of the feeder line from the current geographical coordinates of the jumper toward an endpoint consumer over a determined specification length of the jumper.

9. The system of claim 6, wherein the processing unit, when executing the program instructions stored on the computer-readable storage medium via the computer readable memory:

determines a beginning set of geographical coordinates of a first end of the jumper that is inserted into the feeder at the insertion point that commences a bypass of the feeder by electricity flowing through the feeder to an endpoint consumer;

determines a termination set of geographical coordinates of a second, other end of the jumper that is inserted into the feeder at the termination point that ends the bypass of the feeder by the electricity flowing through the feeder to an endpoint consumer;

determines a displacement length of the jumper from a displacement distance between the beginning set of geographical coordinates of the first end of the jumper and the termination set of geographical coordinates of the second, other end of the jumper; and updates the geographical information system model of the electrical distribution grid to substitute the jumper for a portion of a feeder line from the beginning set of geographical coordinates of the first end of the jumper toward an endpoint consumer over the determined displacement length of the jumper.

10. A computer program product for automatically updating modeling of a distribution network grid in response to real-time, precise location data of uniquely identified jumpers deployed within the distribution network grid, the computer program product comprising:

a computer readable storage medium having computer readable program code embodied therewith, the computer readable program code comprising instructions that, when executed by a computer processing unit, cause the computer processing unit to:

acquire identity indicia for a jumper that is inserted into a feeder line at an insertion point within an electrical distribution grid that is modeled by a geographical information system model of a utility that provides electricity to end users through components of the electrical distribution grid, wherein the jumper has a jumper impedance value per foot of linear length, wherein the feeder has a feeder impedance value per foot of linear length, and wherein the jumper is inserted between parts of a feeder or connecting a first phase to a second phase on a single line;

determine current geographical coordinates of the jumper within a distance tolerance that is selected as one foot in response to determining that the jumper impedance value differs from the feeder impedance value;

determine if a unique identity of the jumper that is indicated by the identity indicia is present within the geographical information system model;

update the geographical information system model with a location of a unique identity of the jumper at the determined current geographical coordinates of the jumper within the distance tolerance, in response to determining at least one of that the unique identity of the device is not present within geographical information system model, and that a displacement distance from a determined current geographical coordinates of the jumper to existing geographic coordinates that are stored in the geographical information system model in association with a unique device identity that exceeds the distance tolerance;

provide the updated geographical information system model to an entity that is selected from the group consisting of a supervisory control and data acquisition system of the utility, a distribution management system of the utility, and an outage management system of the utility; and provide in real-time the determined current geographical coordinates of the jumper within the distance tolerance to the entity; and wherein the entity monitors and controls a network topology of the electrical distribution grid in real-time as a function of the provided updated geographical information system model and the determined current geographical coordinates of the jumper provided in real-time within the distance tolerance.

11. The computer program product of claim 10, wherein the geographical coordinates are three-dimensional coordinates comprising a latitude coordinate, a longitude coordinate and an altitude value;

wherein the computer readable program code instructions, when executed by the computer processing unit, further cause the computer processing unit to update the geographical information system model with the location of the unique identity of the device at the determined current geographical three-dimensional coordinates of the jumper within the distance tolerance by selecting one of two power lines that share common values of no more than two of current geographical three-dimensional longitude, latitude and altitude coordinates determined for the jumper within the distance tolerance as a power line incorporating the jumper, in response to a determining a commonality of values of each of a three-dimensional longitude, latitude and altitude coordinates for the selected one of the two power lines within the distance tolerance; and wherein the distance tolerance is less than a vertical or horizontal spacing distance between the two lines that is defined by a difference in corresponding values of the two power lines for at least one of the three-dimensional longitude, latitude and altitude coordinates that are determined for each of the two power lines.

12. The computer program product of claim 10, wherein the computer readable program code instructions, when executed by the computer processing unit, further cause the computer processing unit to:

determine the current geographical coordinates of the jumper as the geographical coordinates of the jumper insertion point;

determine a specification length of the jumper from a model specified in the identity indicia; and update the geographical information system model of the electrical distribution grid to substitute the jumper for a portion of the feeder line from the current temporary asset geographical coordinates of the jumper toward an endpoint consumer over the determined specification length of the jumper.

13. The computer program product of claim 10, wherein the computer readable program code instructions, when executed by the computer processing unit, further cause the computer processing unit to:

determine a beginning set of geographical coordinates of a first end of the jumper that is inserted into the feeder at the insertion point that commences a bypass of the feeder by electricity flowing through the feeder to an endpoint consumer;

determine a termination set of geographical coordinates of a second, other end of the jumper that is inserted into the feeder at a termination point that ends the bypass of the feeder by the electricity flowing through the feeder to the endpoint consumer;

determine a displacement length of the jumper from a displacement distance between the beginning set of geographical coordinates of the first end of the jumper and the termination set of geographical coordinates of the second, other end of the jumper; and update the geographical information system model of the electrical distribution grid to substitute the jumper for a portion of the feeder line from the beginning set of geographical coordinates of the first end of the jumper toward an endpoint consumer over the determined displacement length of the jumper.

* * * * *